United States Patent [19]
Sakaguchi

[11] Patent Number: 5,524,832
[45] Date of Patent: Jun. 11, 1996

[54] SPINNING REEL

[75] Inventor: Noboru Sakaguchi, Tondabayashi, Japan

[73] Assignee: Shimano Inc., Sakai, Japan

[21] Appl. No.: 242,126

[22] Filed: May 13, 1994

[30] Foreign Application Priority Data

May 14, 1993 [JP] Japan .................................. 5-025041

[51] Int. Cl.⁶ .................................................. A01K 89/01
[52] U.S. Cl. ............................................ 242/233; 242/248
[58] Field of Search ................................. 242/233, 243, 242/247, 248

[56] References Cited

U.S. PATENT DOCUMENTS

| | | | |
|---|---|---|---|
| 2,918,227 | 12/1959 | Mauborgne | 242/243 X |
| 3,258,218 | 6/1966 | Stalder | 242/243 X |
| 4,529,142 | 7/1985 | Yoshikawa | 242/243 |
| 5,289,990 | 3/1994 | Kawabe | 242/233 |
| 5,333,811 | 8/1994 | Hitomi | 242/247 X |

Primary Examiner—Daniel P. Stodola
Assistant Examiner—William A. Rivera
Attorney, Agent, or Firm—Knobbe, Martens, Olson & Bear

[57] ABSTRACT

A spinning reel includes a reel body, a rotor attached to the reel body to be rotatable relative thereto, and a bail supported by the rotor to be switchable between a line releasing position and a line winding position. The rotor supports a switch arm for switching the bail from the line winding position to the line releasing position. A rotation stopper is provided to stop rotation of the rotor in response to an operation of the switch arm to switch the bail to the line releasing position.

19 Claims, 8 Drawing Sheets

SPINNING REEL

BACKGROUND OF THE INVENTION

1. Field of the Invention

The present invention relates to a spinning reel having a rotor rotatably supported by a reel body, and a bail attached to the rotor to be switchable between a line releasing position and a line winding position, the rotor including a control device for switching the bail from the winding position to the releasing position.

2. Description of the Related Art

With a spinning reel of the type noted above, the control device is operable to switch the bail to the line releasing position (i.e. to pick up the bail) forcibly. In order to prevent a fishing line from being inadvertently unreeled from a spool as a result of this switching operation, the user must take a series of steps to hold the line with his or her finger and to operate the switching control device. Then, normally, the user takes a bait casting step while releasing the line from the finger.

If the rotor should rotate inadvertently in the course of action from the operation of the control device to the bait casting, inconveniences would occur, such as the line being unreeled from the spool before the user releases the line, or unreeling of the line being prevented by action of a mechanism which automatically switches the bail from the line releasing position to the line winding position in response to rotation of the rotor. It is therefore necessary to assure that the rotor is stopped during the above operation. However, the rotor cannot be stopped reliably during the series of steps taken as above, only by the finger operating the control device. There is room for improvement in this respect.

A known spinning reel having a rotation stopping mechanism operable with opening and closing of the bail to stop rotation of the rotor is disclosed in Japanese Patent Publication No. 50-19479, for example. In this known spinning reel, the rotation stopping mechanism is automatically operable simply by opening or closing the bail. However, no control device is provided which is operable in a single movement of a free finger of the hand holding the reel and rod. The line must be held with a free finger of the hand holding the reel and rod while picking up the bail with the other hand: The series of steps up to bait casting cannot be conducted smoothly.

SUMMARY OF THE INVENTION

The object of the present invention is to provide a spinning reel which stops rotation of the rotor reliably during an operation of the control device, to enable smooth action from an operation to pick up the bail to a bait casting operation.

The above object is fulfilled, according to the present invention, by a spinning reel having a control device mounted on a rotor for picking up a bail from a line winding position to a line releasing position, and a rotation stopping mechanism for stopping rotation of the rotor in response to an operation of the control device to pick up the bail.

When the control device is operated to switch the bail to the line releasing position, the rotation stopping mechanism automatically operates to stop the rotor. Since inadvertent rotation of the rotor is thereby avoided, the user may carry out a series of steps from the operation to switch the bail to the releasing position to bait casting reliably and smoothly without being distracted by rotation of the rotor.

The control device for opening and closing the bail is used also for controlling the rotation stopping mechanism. Naturally, therefore, no new trouble of operating the rotation stopping mechanism is imposed on the user.

In a preferred embodiment of the present invention, the rotation stopping mechanism comprises a stopper member movable with the bail control device when the latter makes a pivotal movement, to press on a surface of the spool or the like. The stopper member and this surface produce a friction therebetween to check or stop rotation of the rotor. In this embodiment, the control device itself acts as part of the rotation stopping mechanism. The rotation stopping mechanism therefore has a simplified structure.

In another preferred embodiment of the present invention, the rotation stopping mechanism comprises a stopper member movable in response to movement of the bail control device to engage part of the reel body. In this embodiment, not the control device itself but the stopper member connected to the control device contacts part of the reel body to stop the rotor. Specifically, the stopper member may be extendible from the rotor toward the reel body with pivotal movement of the control device.

In a modification of the above specific construction, a toggle mechanism may be provided for biasing the bail to the line winding position or the line releasing position. The toggle mechanism includes a pivotable member having a lower portion extending toward the reel body. This lower portion projects from the rotor when the bail is switched to the line releasing position. Thus, the pivotable member of the toggle mechanism acts also as the stopper member.

The spinning reel, according to the present invention, may include a switch mechanism operable in response to rotation in a line winding direction of the rotor, to switch the bail from the line releasing position to the line winding position. The switch mechanism may include a limit dog formed on the reel body, and a drive arm operatively connected to the bail and displaceably supported by the rotor. The drive arm is pivotable through contact with the limit dog to switch the bail. The drive arm acts also as the stopper member of the rotation stopping mechanism, such that the rotor is stopped by frictional engagement between the drive arm and limit dog.

It will be understood from the above outline of a plurality of embodiments that the rotation stopping mechanism for acting on the rotor embraces a structure utilizing a friction between two members contacting each other under pressure, and a structure utilizing engagement between two members.

The term "stop . . . by means of a geometric configuration" used in an appended claim refers to a well-known stopper mechanism having a displaceable member, and a different member movable into a locus of movement of the displaceable member. The different member makes a geometric interference with movement of the displaceable member. That is, at least a portion of the different member blocks movement of the displaceable member.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENTS

Figure 1:
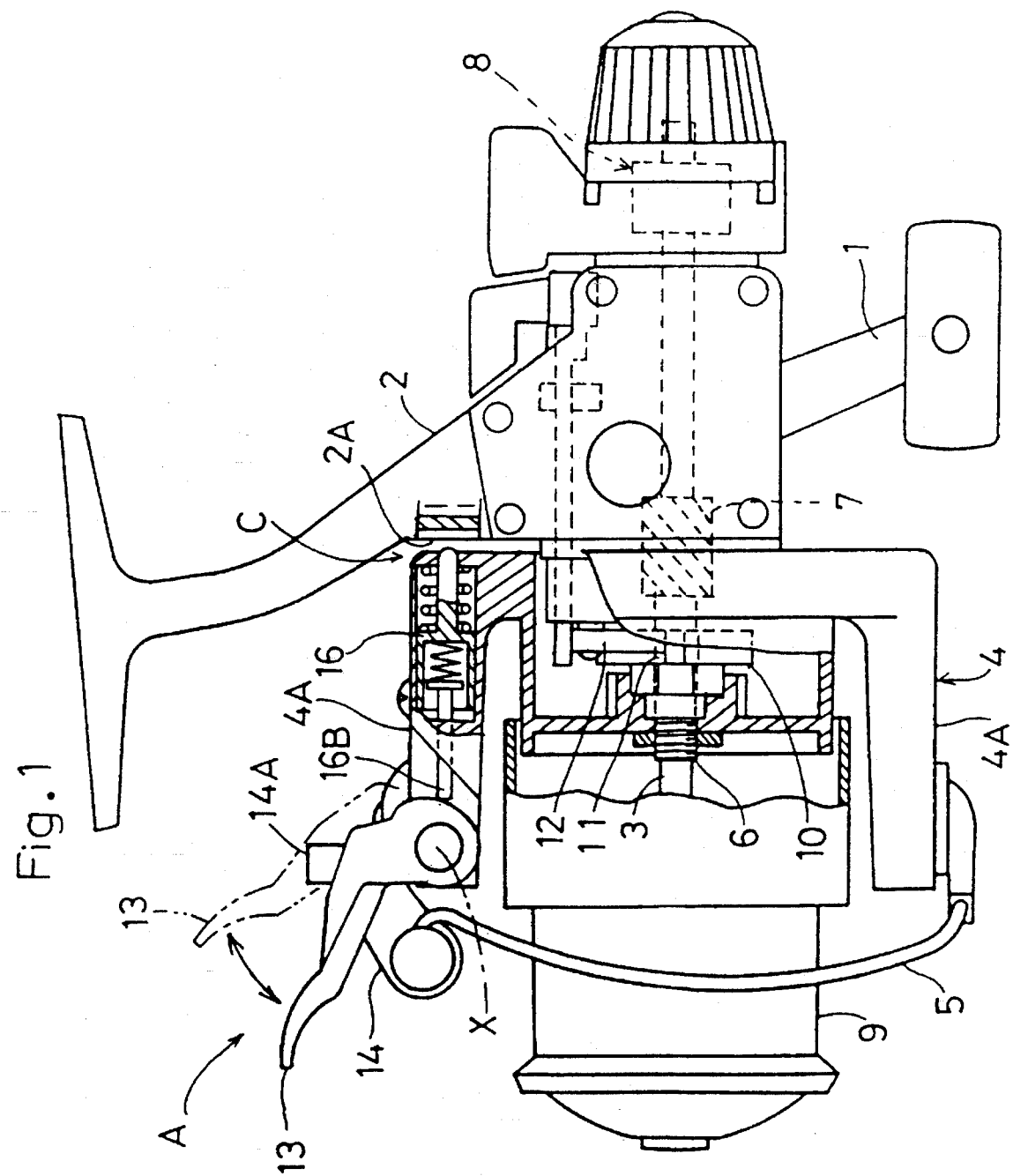
FIG. 1 is a side view, partly in section, of a spinning reel according to the present invention.

As shown in FIG. 1, a spinning reel includes a line winding handle 1 attached to a reel body 2 having a spool shaft 3 projecting from a front surface thereof. A spool 9 and a rotor 4 are mounted on the spool shaft 3. The rotor 4 has a pair of revolving arms 4A for supporting a bail 5 extending therebetween to be switchable between a line winding position and a line releasing position. The reel body 2 houses a sleeve shaft 6 relatively rotatably mounted on the spool shaft 3 to act as part of a rotor driving system. The sleeve shaft 6 has a pinion gear 7 formed thereon to receive drive from the handle 1, with the rotor 4 mounted on the sleeve shaft 6 to be rotatable therewith. The spinning reel further includes a drag mechanism 8 disposed rearwardly of a rear surface of the reel body 2 to brake the spool 9 and spool shaft 3.

Figure 4:
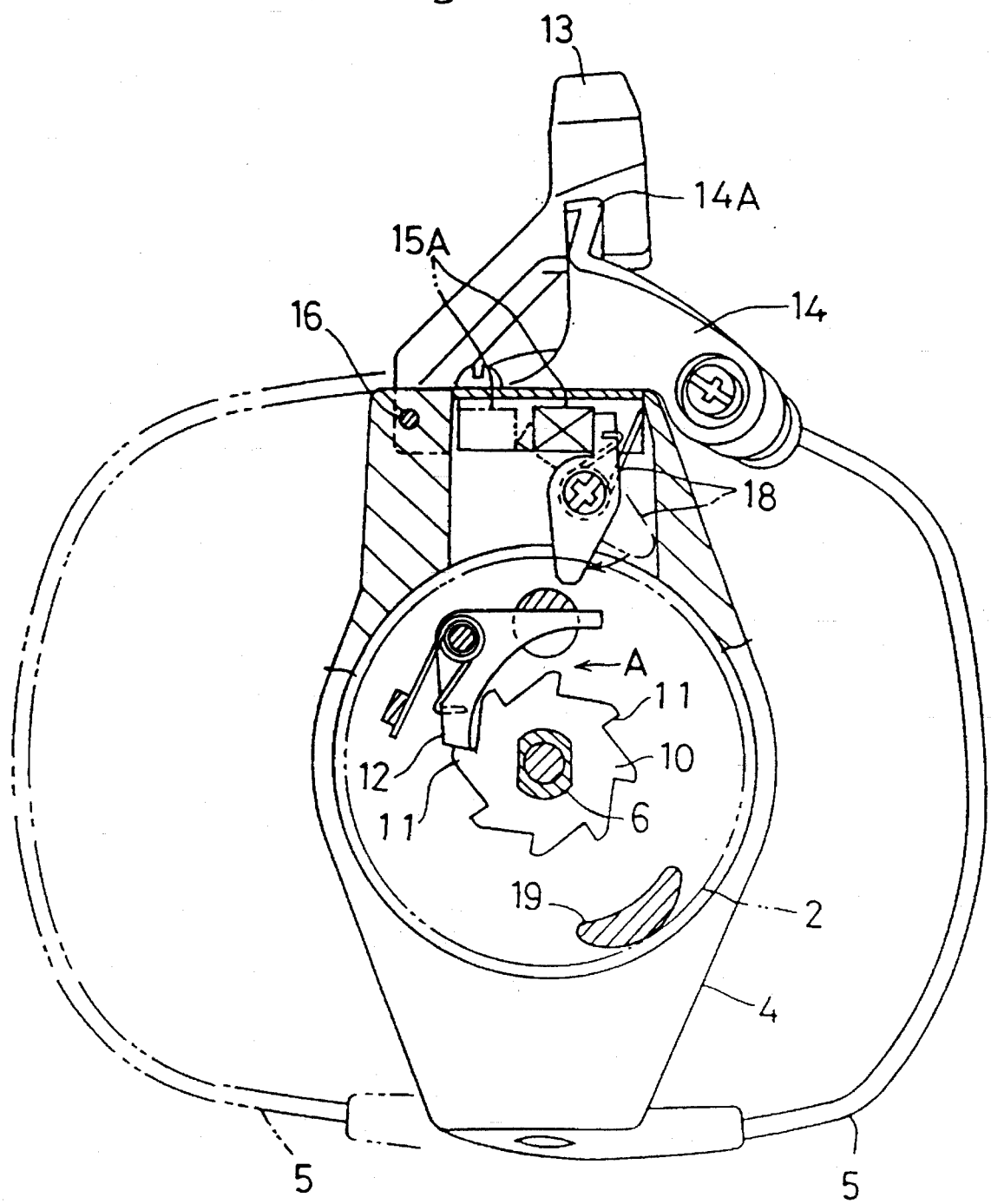
FIG. 4 is a sectional rear view showing a stopper mechanism in operation.

As shown in FIGS. 1 and 4, a stopper mechanism A includes a rotatable member 10 mounted for unitary rotation on the sleeve shaft 6 projecting forward from the reel body 2. The rotatable member 10 has a plurality of engaging teeth 11 formed peripherally thereof. These teeth 11 are engageable with an engaging pawl 12 pivotably attached to the front surface of the reel body 2. The rotor 4 may be stopped in a plurality of phases by engagement between the engaging pawl 12 and engaging teeth 11.

Figure 2:
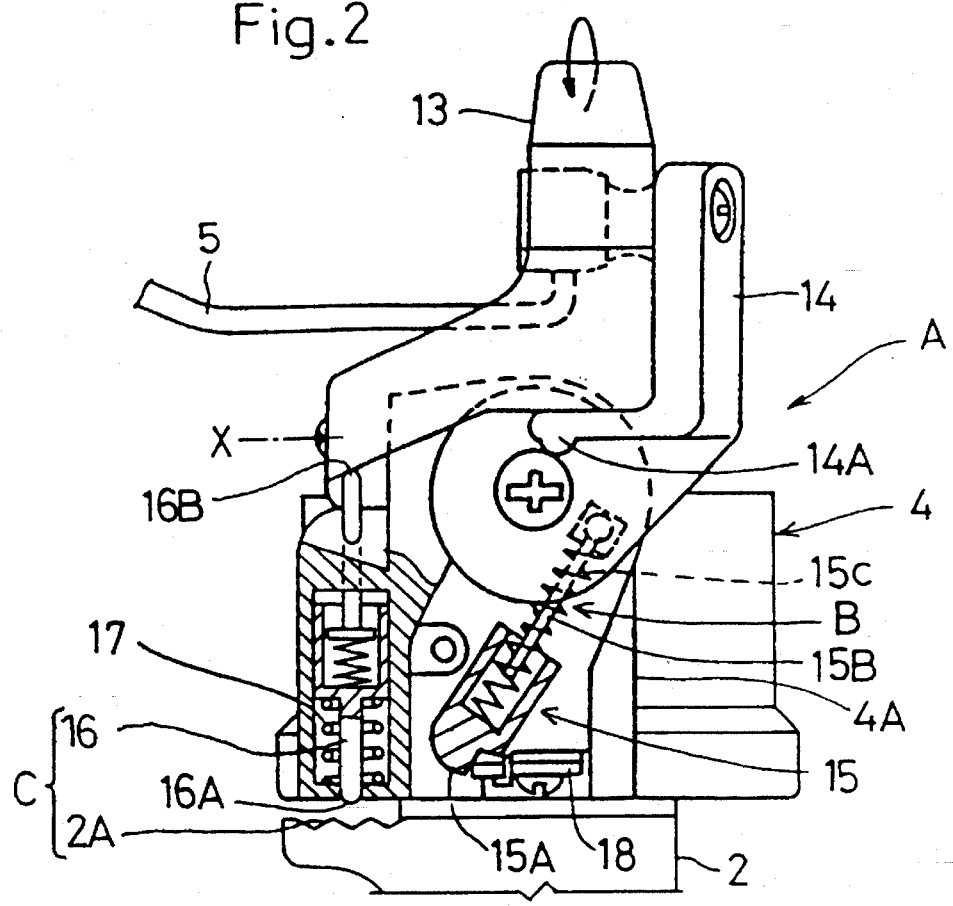
FIG. 2 is a fragmentary sectional plan view of the spinning reel with a rotation stopping mechanism placed in an inoperative position.

As shown in FIGS. 1 and 2, one of the revolving arms 4A of the rotor 4 has a switch arm 13 attached thereto to be pivotable about a transverse axis X for forcibly opening the bail outwardly to the line releasing position. The switch arm 13 is movable into contact with an arm cam 14 supporting one end of the bail 5, for forcibly swinging the arm cam 14 to switch the bail to the line releasing position.

Figure 3:
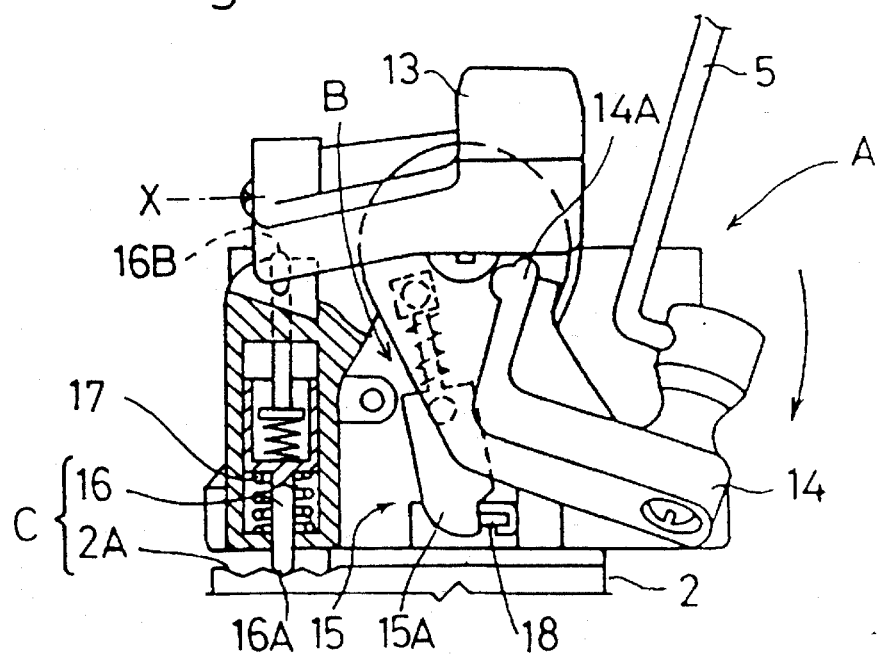
FIG. 3 is a fragmentary sectional plan view showing the rotation stopping mechanism in operation.

A switching mechanism B for switching the bail 5 to the line releasing position by means of the switch arm 13 will be described next. As shown in FIGS. 2 and 3, the revolving arm 4A contains a toggle mechanism 15 in an interior space thereof. The toggle mechanism 15 includes a pivotable case 15A, a piston 15B mounted in the case 15A, and a spring 15C for biasing the piston 15B in a projecting direction. The toggle mechanism 15 is interlocked at an extreme end thereof to the arm cam 14 to retain the arm cam 14 and bail 5 in the line releasing position or line winding position under the spring load of the toggle mechanism 15. As shown in FIGS. 3 and 4, a drive arm 18 is disposed adjacent a rear end of the case 15A and supported by the revolving arm 4A to be pivotable sideways about a fore and aft axis. An upper end of the drive arm 18 is movable into contact with the case 15A to drive the latter. A limit dog 19 is formed on the front surface of the reel body 2. When the case 15A is in a position corresponding to the line releasing position, the drive arm 18 contacts the limit dog 19 as a result of rotation of the rotor 4. The drive arm 18 thereby pivots to drive the case 15A to switch the bail 5 to the line winding position. Thus, a line winding operation of the handle 1 automatically causes the bail 5 to return from the line releasing position to the line winding position.

As shown in FIGS. 2 and 3, the arm cam 14 includes a projection 14A formed on an upper surface of a proximal portion thereof for contacting the switch arm 13. When the switch arm 13 is pulled toward the user to cause it to pivot about the axis X, the switch arm 13 pushes the projection 14A to swing the arm cam 14 forcibly, thereby switching the bail 5 from the line winding position to the line releasing position. The revolving arm 4A contains a stopper piston 16 along with the toggle mechanism 15 in the interior space thereof. The stopper piston 16 has an end thereof projecting toward the reel body 2 and defining a stopper 16A for acting on a stopper surface described later. The other end 16B of the stopper piston 16 projects toward the switch arm 13 to contact a cam surface 13B formed on a proximal portion of the switch arm 13. The switch arm 13 is biased by a spring 17 in a retracting direction.

As shown in FIGS. 2 and 4, a stopper surface 2A is formed on the front surface of the reel body 2 opposed to the revolving arm 4A. The stopper surface 2A is in the form of a rugged engaging surface arranged in the circumferential direction on the front surface. The stopper 16A is in the form of an engaging projection for engaging recesses in the rugged surface. When the switch arm 13 is operated to switch the bail 5 from the line releasing position to the line winding position, the proximal portion of the switch arm 13 pushes the other end 16B of the stopper piston 16. As a result, the engaging projection of the stopper piston 16 engages the stopper surface 2A to lock the rotor 4 against rotation. Thus, when the bail 5 is switched to the line releasing position, the rotor 4 is locked against rotation to facilitate operation of the switch arm 13. The user may operate the switch arm 13 simply by hooking the line with one finger and continuing to move the finger in the switch arm operating direction. The stopper piston 16 and the stopper surface 2A on the front surface of the reel body 2 constitute a rotation stopping mechanism C for acting on the rotor 4.

Figure 9:
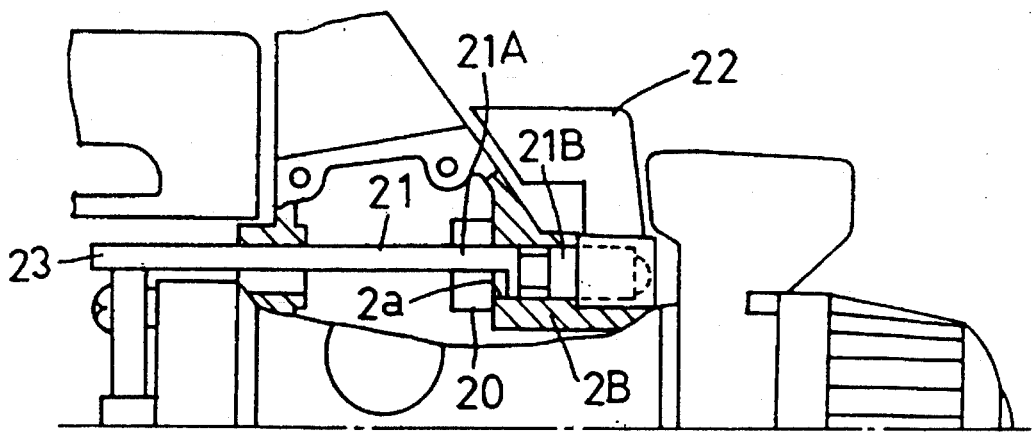
FIG. 9 is a side view in vertical section showing a stopper control rod.

A supporting boss 2B extends in the fore and aft direction through a rear wall of the reel body 2. The supporting boss 2B has a supporting bore 2a of circular section defined in an axial position thereof for receiving and supporting a stopper control rod 21. As shown in FIG. 9, the stopper control rod 21 includes a portion having a non-circular section 21A formed by cutting a forward length of a shank portion having a circular section to a half cylinder. A cylindrical portion 21B having a large and a small circular sections extends rearward from the non-circular portion 21A. A stopper knob 22 is attached to a mar end of the cylindrical portion 21B for rotating the stopper control rod 21. The non-circular portion 21A includes a cam portion 23 at a forward end thereof for acting on the end of the engaging pawl 12 remote from the engaging teeth 11. The cam portion 23 moves the engaging pawl 12 away from the engaging teeth 11 to prevent the stopper mechanism A from rotating the rotor 4 backward.

Figure 10:
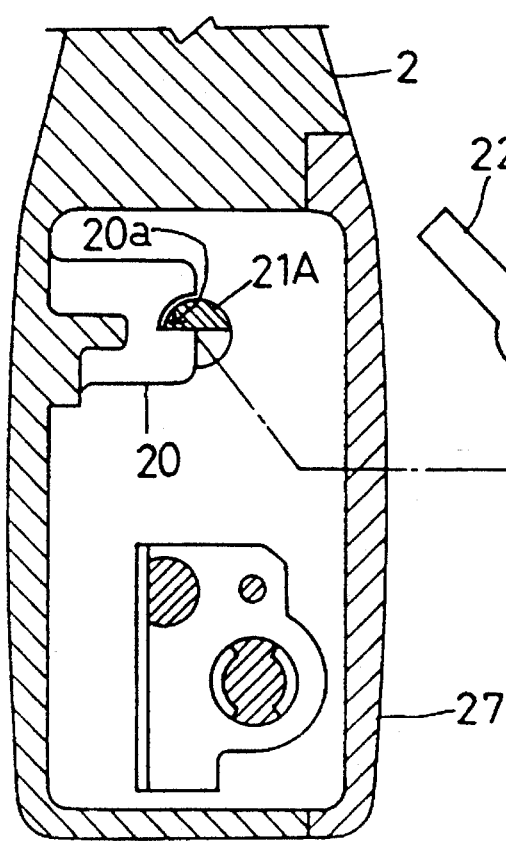
FIG. 10 is a front view of the stopper mechanism in an inoperative position.
Figure 11:
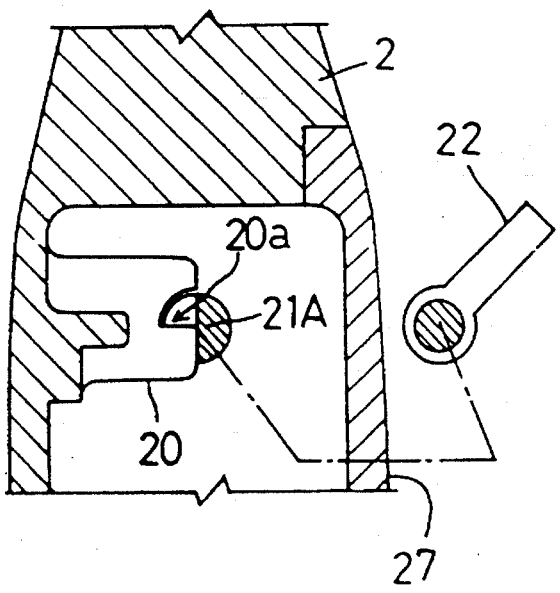
FIG. 11 is a front view of the stopper mechanism in an operative position.

As shown in FIGS. 9 and 10, the reel body 2 includes a cantilever wall 20 extending inwardly from an inner surface of a side wall thereof and disposed forwardly of a forward end of the supporting boss 2B. The cantilever wall 20 has a cutout 20a defined in a distal end surface thereof to act as a limiting contact portion. This cutout 20a has a sectional shape of a quarter circle for limiting rotation of the non-circular portion 21A of the stopper control rod 21. When the stopper control rod 21 is rotated in one direction about its axis, one part of a surface of the non-circular portion 21A contacts a receiving surface of the cutout 20a, as shown in FIG. 10, to limit rotation of the stopper control rod 21. When the stopper control rod 21 is rotated in the other direction, a different part of the surface of the non-circular portion 21A contacts the end surface of the cantilever wall 20, as shown in FIG. 11, to limit rotation of the stopper control rod 21. In the horizontal posture of the non-circular portion 21A shown in FIG. 10, the cam portion 23 is separated from the engaging pawl 12 for allowing the engaging pawl 12 to engage the engaging teeth 11. This is an inoperative position of the stopper mechanism A. When the stopper control rod 21 is rotated to place the non-circular portion 21A in the vertical posture shown in FIG. 11, the cam portion 23 acts on the engaging pawl 12 to move the engaging pawl 12 away from the engaging teeth 11. This is an operative position of the stopper mechanism A.

The following structures may be employed for limiting rotation of the stopper control rod 21:

(1) Instead of the cutout 20a, the limiting contact portion may be in a form other than a recess, such as a shoulder or projection.

Figure 12:
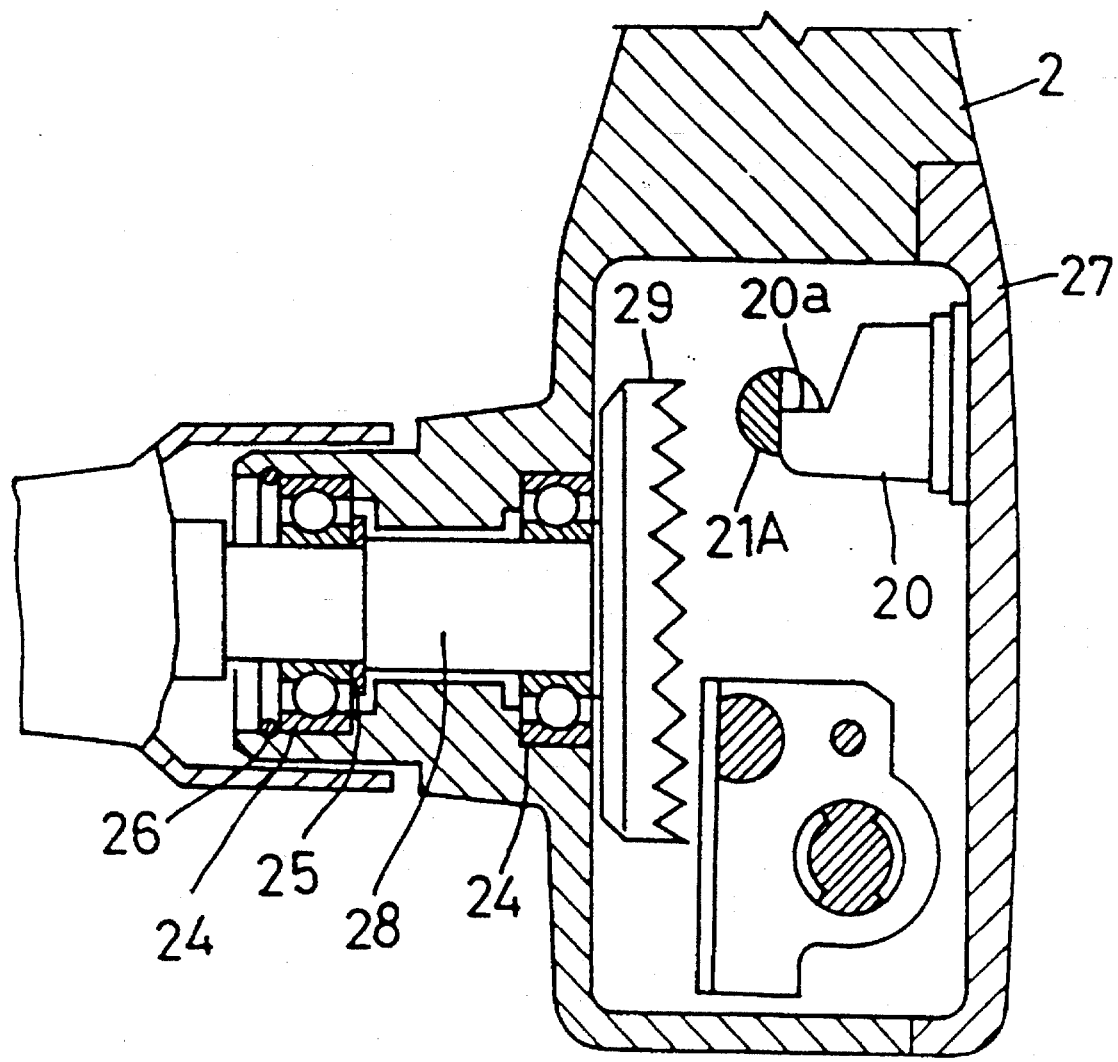
FIG. 12 is a front view in vertical section showing an embodiment having a cantilever wall formed on a lid.

(2) FIG. 12 shows a different example of limiting structures. A cantilevered handle shaft 28 has a drive gear 29 attached to an inward end thereof and meshed with a pinion gear 8. A lid 27 is attached to a right side of the reel body 2 opposed to a left side supporting the handle shaft 28. The lid 27 includes a cantilever wall 20 projecting from an inner surface thereof, with a cutout 20a formed in a projecting end of the cantilever wall 20 to limit rotation of the stopper control rod 21. This structure produces the same effect as the foregoing structure having the cutout 20a formed in the cantilever wall 20 projecting from the inner surface of the reel body 2 to limit rotation of the stopper control rod 21. The cantilevered handle shaft 28 is supported by two bearings 24 spaced apart axially thereof. An adjusting washer 25 and a hexagonal retainer spring 26 are mounted on the handle shaft 24 adjacent one of the bearings 24 to maintain the handle shaft 28 in place. The adjusting washer 25 may be changed simply by removing the retainer spring 26 and bearing 24. By using an adjusting washer 25 having a different thickness, an adjustment may be made to eliminate chattering from the engagement between the drive gear 29 and pinion gear 8. Since the retainer spring 26 is used to maintain the beating 24 and handle shaft 28 in place, the adjusting washer may easily be replaced with a washer having a different thickness simply by removing the retainer spring 26. The washer changing operation does not require detachment of the lid 27 or other steps.

(3) In the preceding embodiment, the cantilever wall 20 defining the cutout 20a projects from the reel body 2 as an integral part thereof. Instead of such a structure, a separate wall member defining a cutout 20a may be screwed to the reel body 2.

(4) The cutout 20a may have any Other sectional shape than the quarter circle, i.e. may be rectangular in section, as long as it allows movement of the non-circular portion and limits the movement with a receiving surface.

(5) The non-circular portion 21A of the stopper control rod 21 may have a polygonal sectional shape.

Other Embodiments

A material, such as felt, having a high coefficient of friction may be applied to the stopper surface 2A to act as a friction brake combined with the stopper piston 16. An increased coefficient of friction may be attained by coating the surface with a resin or the like, or forming fine irregularities on the surface.

Figure 5:
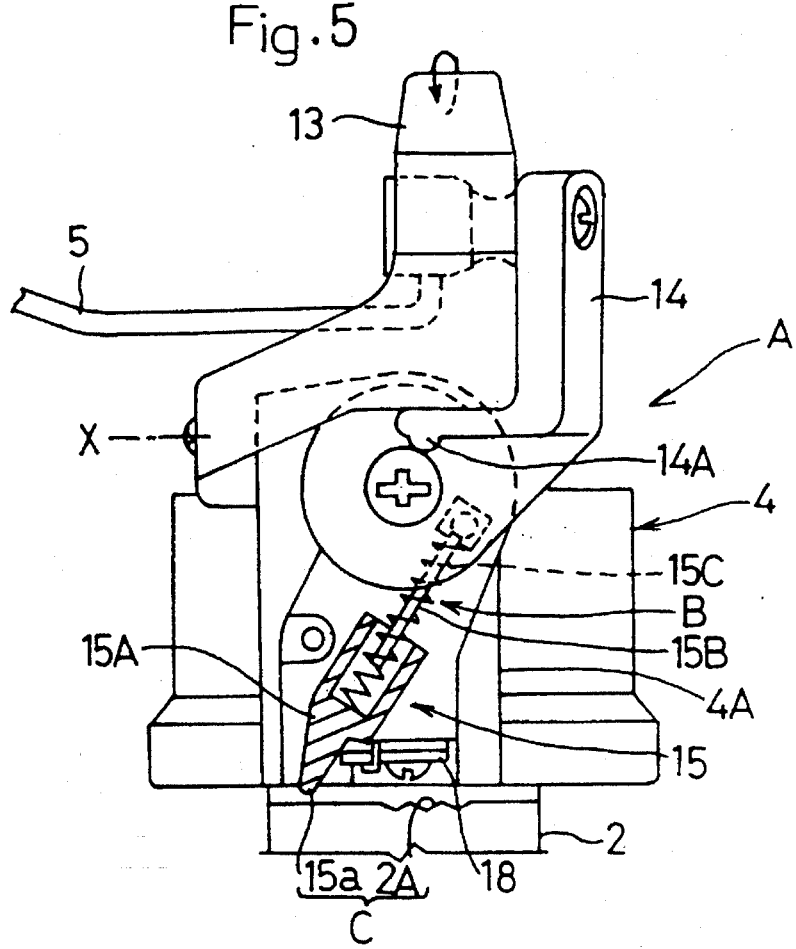
FIG. 5 is a sectional plan view showing a modified rotation stopping mechanism in an inoperative position.
Figure 6:
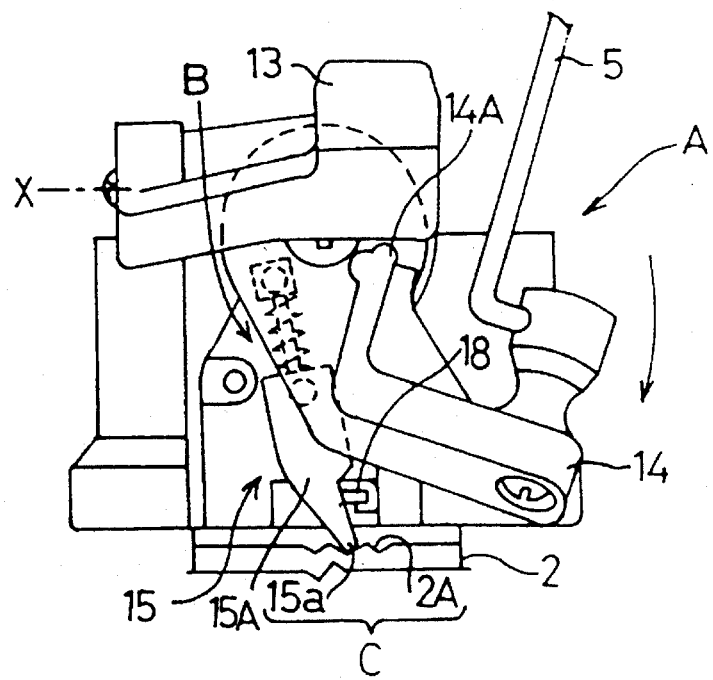
FIG. 6 is a fragmentary sectional plan view showing the modified rotation stopping mechanism in operation.

The rotation stopping mechanism C may be modified as shown in FIGS. 5 and 6. Here, the case 15A of the toggle mechanism 15 has an extended rear end which, when the bail 5 is in the line releasing position, contacts the stopper surface 2A on the front surface of the reel body 2 to apply a braking force to the rotor 4. In this case, the arm cam 14 is used to cause the case 15A acting as a stopper to contact the stopper surface 2A with operation of the switch arm 13 acting as the control device.

Figure 7:
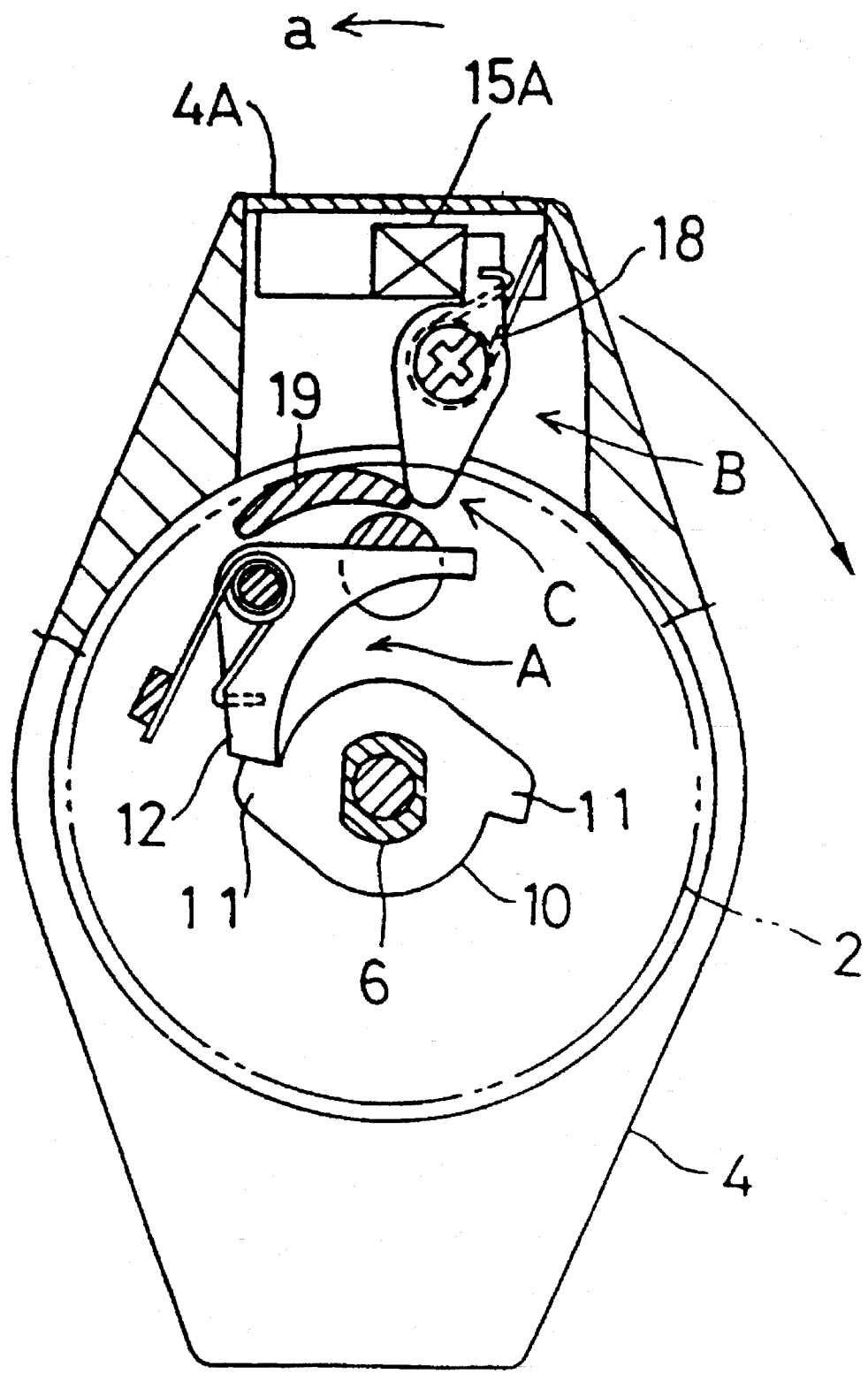
FIG. 7 is a sectional rear view showing another rotation stopping mechanism, in which a limit dog contacts a drive arm with operation of the stopper mechanism.

FIG. 7 shows another rotation stopping mechanism C with the limit dog 19 disposed in a different position. This limit dog 19 acts on the drive arm 18 to stop the rotor moving in the direction indicated by arrow "a". Points of contact between the limit dog 19 and drive arm 18 may be coated with a material having a high coefficient of friction, to suppress opposite rotations of the rotor 4. However, it is sufficient to stop the rotation of rotor 4 in the direction of arrow "a" in response to a finger operation of the control device.

Figure 8:
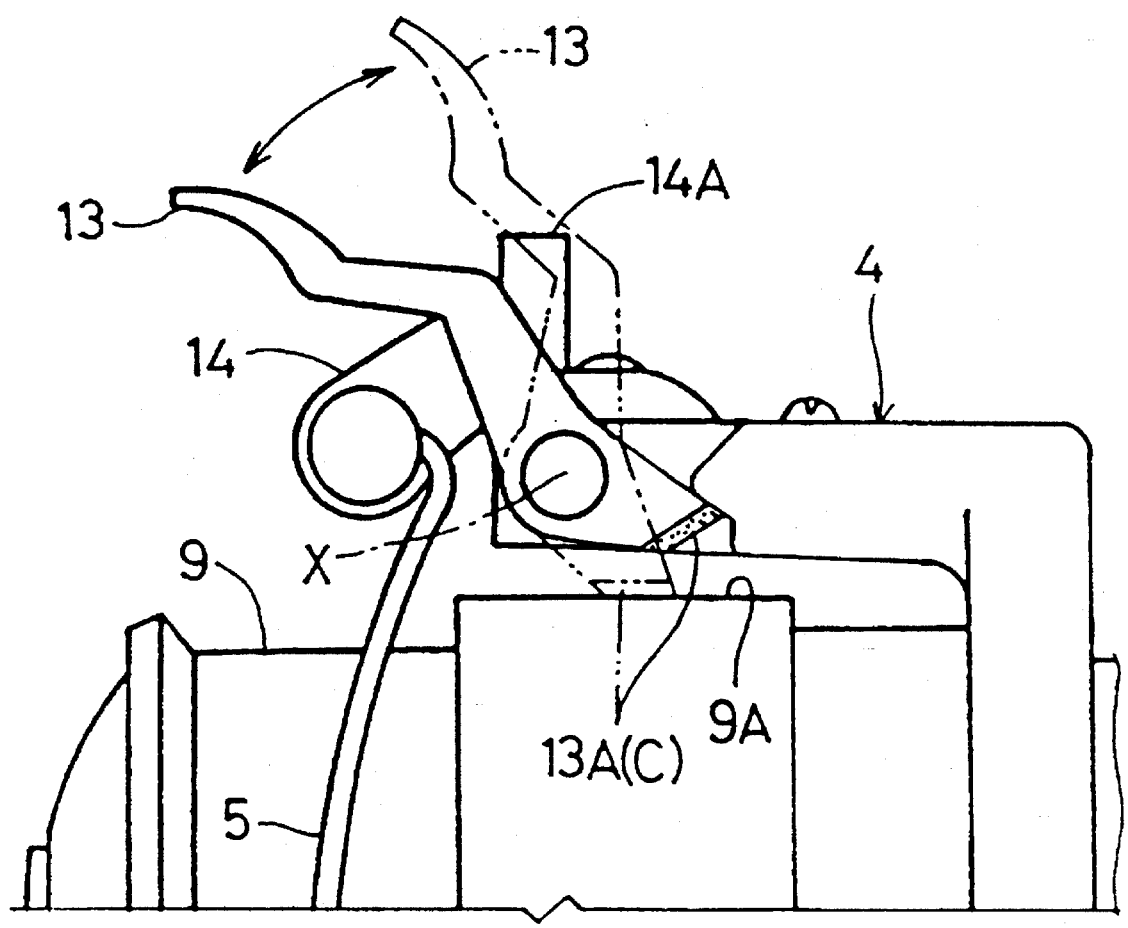
FIG. 8 is a side view of a further modified rotation stopping mechanism.

As shown in FIG. 8, the switch arm 13 may include an extension 13A formed on the proximal end thereof and having a predetermined length. When the switch arm 13 is swung toward the user to switch the bail 5 to the line releasing position, the extension 13A contacts a rear skirt portion 9A of the spool 9 to stop rotation of the rotor 4. Thus, this rotation stopping mechanism C frictionally brakes the rotor 4 with the extension 13A pressed on the skirt portion 9A. As noted above, an increased frictional force may be attained by coating the extension 13A and skirt portion 9A with a resin or the like, or forming irregularities on their surfaces for braking the rotor 4 by means of engagement between the extension 13A and skirt portion 9A.

The stopper mechanism A may include an engaging portion 11 formed on an inner peripheral wall of a center front recess of the rotor 4. This engaging portion 11 may be in the form of engaging teeth arranged at predetermined intervals in the circumferential direction on the inner peripheral wall.

What is claimed is:

1. A spinning reel comprising:

a reel body;

a rotor attached to said reel body to be rotatable relative thereto;

a bail supported by said rotor to be switchable between a line releasing position and a line winding position;

control means supported by said rotor to be movable between a first position and a second position, said control means being movable from said first position to said second position to switch said bail from said line winding position to said line releasing position; and rotation stopping means for stopping rotation of said rotor relative to said reel body in response to movement of said control means from said first position to said second position.

2. A spinning reel as defined in claim 1, wherein said control means is pivotable about an axis extending substantially perpendicular to a rotational axis of said rotor.

3. A spinning reel as defined in claim 1, wherein said bail is supported by said rotor through an arm cam having a projection, said control means being movable into contact with said projection of said arm cam to swing said arm cam, thereby to switch said bail from said line winding position to said line releasing position.

4. A spinning reel as defined in claim 1, wherein said rotation stopping means comprises a stopper member extendible from said rotor with movement of said control means, and a contactable portion formed on said reel body to be contactable with said stopper member extended from said rotor.

5. A spinning reel as defined in claim 4, wherein said stopper member is provided on said control means.

6. A spinning reel as defined in claim 5, wherein said stopper member includes a stopper portion extending from a pivotal axis of said control means in a different direction to said control means.

7. A spinning reel as defined in claim 4, wherein said contactable portion comprises a stopper surface formed on a spool.

8. A spinning reel as defined in claim 4, wherein said stopper member is provided on said rotor to be displaceable in response to movement of said control means.

9. A spinning reel as defined in claim 8, wherein said stopper member is reciprocable parallel to a rotational axis of said rotor, said stopper member including a stopper portion for contacting said contactable portion, and a drive receiving portion for contacting said control means to convert pivotal movement of said control means into reciprocating movement.

10. A spinning reel as defined in claim 9, wherein said control means has a cam surface rotatable with operation thereof, said drive receiving portion being displaceable by said cam surface, said stopper portion and said drive receiving portion being interconnected through biasing means.

11. A spinning reel as defined in claim 8, further comprising a toggle mechanism for biasing said bail to one of said line winding position and said line releasing position, said toggle mechanism including a toggle case pivotably supported by said rotor, said stopper member being an extension extending substantially downward from said toggle case to be pivotable toward said contactable portion with an operation of said control means to switch said bail from said line winding position to said line releasing position.

12. A spinning reel as defined in claim 1, further comprising switch means, operable in response to rotation in a line winding direction of said rotor, to drive said control means so as to switch said bail from said line releasing position to said line winding position, said switch means including:

a limit dog substantially fixed to said reel body; and a drive arm operatively connected to said bail and displaceably supported by said rotor to be extendible toward a rotational axis of said rotor, said drive arm in an extended position being movable through contact with said limit dog to switch said bail from said line releasing position to said line winding position in response to the rotation in said line winding direction of said rotor.

13. A spinning reel as defined in claim 1, wherein said rotation stopping means is operable to stop rotation of said rotor by means of a geometric configuration.

14. A spinning reel as defined in claim 1, wherein said rotation stopping means is operable to stop rotation of said rotor by means of a frictional force.

15. A spinning reel comprising:

a reel body;

a rotor attached to said reel body to be rotatable relative thereto;

a bail supported by said rotor to be switchable between a line releasing position and a line winding position;

a switch arm supported by said rotor to be movable between a first position and a second position, said switch arm being movable from said first position to said second position to switch said bail from said line winding position to said line releasing position; and a rotation stopper for stopping rotation of said rotor relative to said reel body in response to movement of said switch arm from said first position.

16. A spinning reel as defined in claim 15, wherein said switch arm is pivotable about an axis extending substantially perpendicular to a rotational axis of said rotor.

17. A spinning reel as defined in claim 15, wherein said bail is supported by said rotor through an arm cam having a projection, said switch arm being movable into contact with said projection of said arm cam to swing said arm cam, thereby to switch said bail from said line winding position to said line releasing position.

18. A spinning reel as defined in claim 15, wherein said rotation stopper comprises a stopper member extendible from said rotor with movement of said switch arm, and a contactable portion formed on said reel body to be contactable with said stopper member extended from said rotor.

19. A spinning reel as defined in claim 15, further comprising a drive mechanism, operable in response to rotation in a line winding direction of said rotor, to drive said switch arm so as to switch said bail from said line releasing position to said line winding position, said drive mechanism including:

a limit dog substantially fixed to said reel body; and a drive arm operatively connected to said bail and displaceably supported by said rotor to be extendible toward a rotational axis of said rotor, said drive arm in an extended position being movable through contact with said limit dog to switch said bail from said line releasing position to said line winding position in response to the rotation in said line winding direction of said rotor.

* * * * *